APPLICANTS
Keith Begbie Brough-Cunningham
Leonard George Wardle and
Michael Cullen
BY
    Misegades & Douglas
        ATTORNEYS

United States Patent Office 3,467,889
Patented Sept. 16, 1969

3,467,889
ELECTRICAL MEASURING SYSTEMS
Keith Begbie Brough-Cunningham, Leonard George Wardle, and Michael Cullen, Stafford, England, assignors to The English Electric Company Limited, London, England, a British company
Filed Dec. 13, 1966, Ser. No. 601,398
Claims priority, application Great Britain, Dec. 17, 1965, 53,598/65
Int. Cl. H02h 3/28, 7/26
U.S. Cl. 317—28                                                11 Claims

ABSTRACT OF THE DISCLOSURE

An electrical measuring system for measuring a transmission parameter, e.g. current, in a high voltage line comprises a transmitter unit suspended from the high voltage line and a receiver unit at a ground station.

Figure 1:
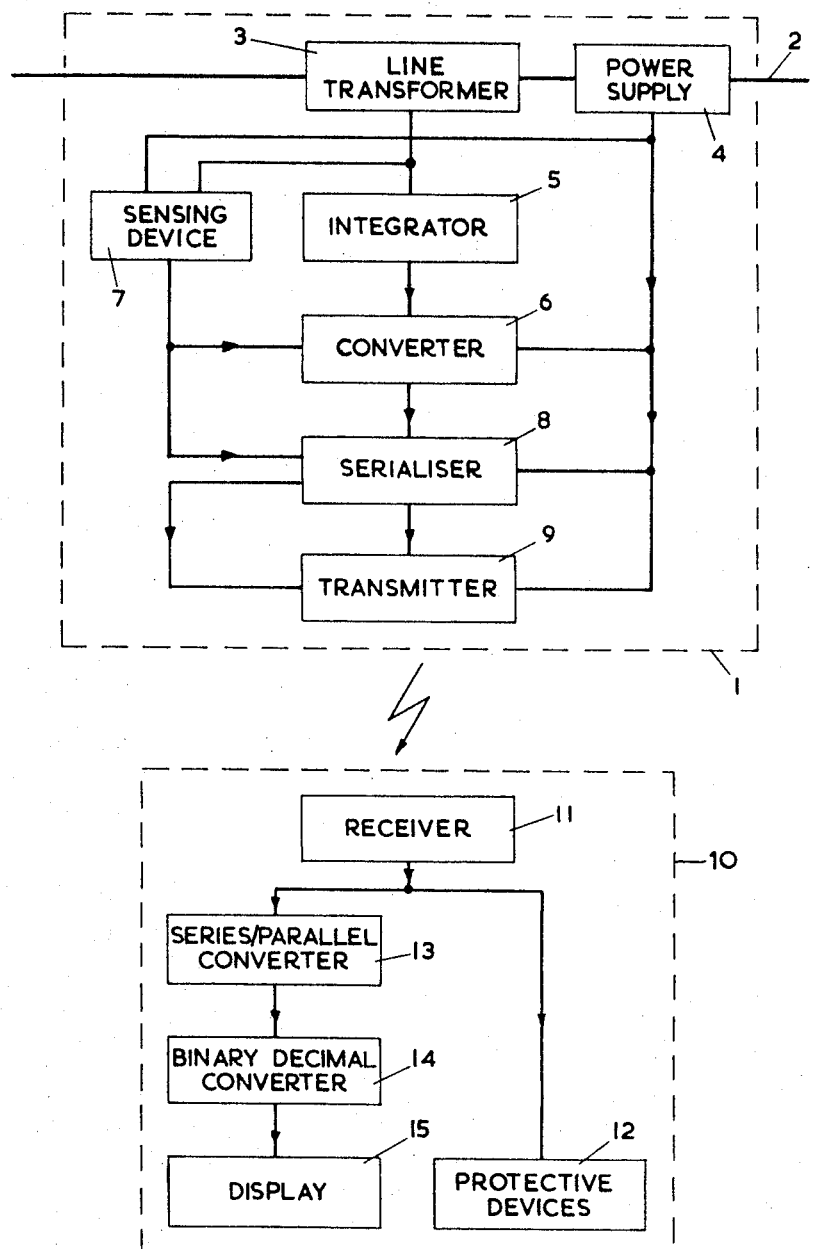

The transmitter unit includes a transformer whose primary winding is constituted by the high voltage line and an integrator connected to the secondary winding of the transformer for providing an analogue voltage which is directly proportional to, and in phase with, the transmission parameter. The analogue voltage is monitored over a predetermined period of its cycle in a converter which also converts the monitored information into digital information in serial form. The digital information is then serialised and fed to an R.F. transmitter for transmission to the ground station.

The ground station includes a receiver whose output is connected to a serial to parallel converter for reconverting the received digital information into parallel form. This digital data is then inverted into complementary decimals in a binary to decimal converter and fed to a display device. The received digital information is also fed to protective relay devices for opening a circuit breaker in the event of the received information being indicative of a fault on the high voltage line.

---

This invention relates to electrical measuring systems, and more particularly, but not exclusively, relates to a system for measuring high voltage line current.

From one aspect, the present invention consists in a system for measuring a transmission parameter in a high voltage line comprising means for monitoring said parameter over a predetermined period of its cycle and converting the monitored signal from analogue form into digital form, a transmitter for transmitting the digital information in serial form, the monitoring means and the transmitter being suspended from the high voltage line, and a receiver at a ground station for receiving the transmitted information and deriving therefrom a measurement of said parameter.

The parameter measured may be the line current, and both the transmitter and receiver may conveniently be located adjacent a circuit breaker, the system being coupled to protective devices for operating said breaker in the event of the line current exceeding a predetermined value.

In addition to the system being operative to actuate protective devices a visual display of the value of line current, in digital form, may also be provided.

By transmitting the information in serial form, a considerable conservation in bandwidth is achieved compared with that which would be required if the information were transmitted in parallel or "line abreast." The system may thus operate on any allocated spot carrier frequency, and for three-phase lines, three separate transmitter-receiver systems may be employed having different carrier frequencies; these frequencies may in fact be of the order of 1500 mc./s. and extend over a bandwidth of up to 10 kc./s., and may be separated from one another by 25 mc./s.

The information transmitted may be represented by ten bits or binary digits, which can accurately represent line current values of between a small percentage of the full load current and a multiple e.g. 75 times of this full load current.

Figure 2:
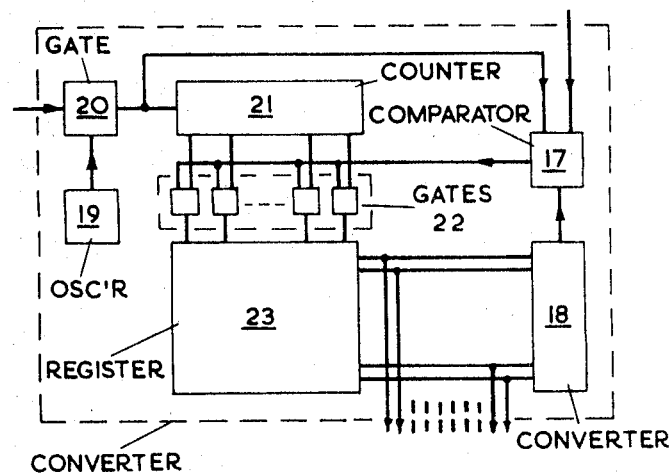
Figure 3:
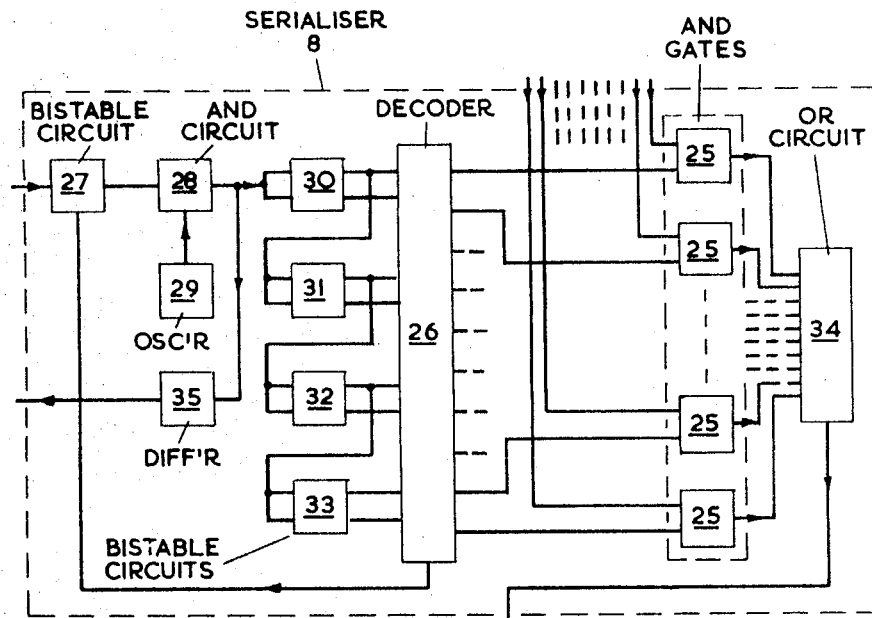

In order that the invention can be fully understood, one embodiment thereof will now be described with references to the accompanying drawings, in which:

FIGURE 1 illustrates a block diagram of the transmitter and receiver;
FIGURE 2 illustrates a schematic circuit diagram of the analogue-to-digital converter; and
FIGURE 3 illustrates a schematic circuit diagram of the parallel-series converter.

Referring now to FIGURE 1 a transmitter unit 1 is mounted on an E.H.V. line 2 (only one phase being shown), and comprises an air cored non-saturable transformer 3 responsive to the line parameter, i.e. current, to be monitored and a power supply unit 4 which may conveniently comprise a current transformer and means for rectifying, smoothing and stabilising the voltage developed therefrom.

An integrator 5 is coupled to the transformer 3 and the output from the integrator is fed to an analogue-to-digital converter 6.

In addition, a signal is fed to a sensing device 7 which applies "command" pulses to both the converter 6 and a serialiser 8 which receives the output from this converter.

The serialised digital output from the unit 8 is then fed to a U.H.F. transmitter 9 from which the information is transmitted to a receiver unit 10 at a ground station.

This unit comprises a highly selective U.H.F. receiver 11 the output of which, in serial form, is fed to protective relay devices 12 and a series-parallel converter 13 where the information is fed through a counting matrix to be aligned in parallel form. This information is then inverted into complementary decimals in a binary-decimal converter 14 and then fed to a display device 15.

More particularly, the "coreless" transformer 3 is wound about the line conductor, which serves as the primary, adjacent a circuit-breaker (not shown) controlling one end of the line. A Faraday screen is disposed between the primary and secondary windings and the secondary winding is such that it possesses a relatively high resistance but very little inductance. Any change in the primary current produces a proportional voltage in the secondary and by suitable choice of the winding parameter the voltage applied to the integrator 5, a resistor-capacitor circuit, can be phase-displaced by 90° so that the resultant voltage developed across the capacitor is directly proportional to, and in phase with, the primary (line) current.

This analogue voltage is applied directly to the analogue-digital converter 6 (FIG. 2), and the secondary voltage is fed to the sensing device 7 which differentiates this signal and develops a "command" pulse to initiate sequences in the converter 6 and serialiser 8. The voltage applied to the sensing device is displaced by 90° from the line current, and accordingly, upon differentiation, the output or command pulse from the sensing device coincides with each voltage maximum (current zero) where the rate of change is minimal.

Referring now to FIGURE 2, the analogue input is applied directly to a comparator 17 which also receives a feed-back analogue signal from a resistor diode network 18 which serves as a digital-to-analogue converter of the data fed in parallel form to the serialiser 8. The comparator is actuated by clock signals from an oscillator 19 for a period determined by the time for which a gating circuit 20 is opened by the command pulse fed thereto. These clock signals are also fed to a scale-of-ten counter 21 the output of which conditions ten gates 22 which in turn set a digital register 23 in dependence on the output from the comparator 17.

More particularly, the register 23 is initially cleared and then the flip-flops in this register are sequentially set to binary 1 at, for example, 10 μsec. intervals by the clock signals applied to the counter 21. At each step, the digital output is converted into an analogue voltage in the network 18 and is compared in the comparator 17 with the input from the integrator 5. If the input voltage is not less than the voltage from the network 18 the appropriate gate 22 is not affected and the corresponding flip-flop in the register 23 is left in its "1" state. If the input voltage is lower however, then the flip-flop is reset to "0." This process of successive approximation continues until the whole register has been sampled, i.e. for a period of 100 μsecs., whereupon the output in parallel form is fed to the serialiser 8.

Although both the positive and negative line current excursions are sampled, the parallel output from this converter 6 is arranged to be in the positive sense only.

Referring now to FIGURE 3, which shows the component parts of the serialiser, the parallel output from the converter 6, on ten lines, is fed to one input of a corresponding number of AND gates 25, the other input of these gates being activated sequentially by signals issuing from a diode matrix decoder 26 within the interval between successive command pulses.

This sequential activation is effected by a counting circuit comprising a bistable circuit 27 which is triggered into one state by the command pulse from the sensing device 7 and which is operative to "open" an AND circuit 28 to permit the passage therethrough of shaped pulses from an oscillator 29. This AND circuit remains "open" until the bistable circuit 27 is triggered into its other state by a pulse from the decoder 26 as explained below.

In particular, the output pulses from the AND circuit 28 are fed to a first bistable circuit 30 which operates as a divide-by-two counter, that is, one output pulse is produced in response to two input pulses. In the present arrangement the input pulse is actually applied in parallel to this circuit 30 so that complementary outputs (0, 1) are produced therefrom. A "carry" is effected from one of the parallel outputs to a second bistable circuit 31, which operates as a divide-by-two counter, and similarly carries are effected from this circuit to further divide-by-two counters 32 and 33. The final carry, from counter 33, triggers the bistable circuit 27, so as to "close" the AND circuit 28 after 2 x 2 x 2 x 2, i.e. 16 pulses have been passed thereby.

The operation performed by the decoder 26 is to assimilate the input pulses which are applied thereto in timed sequence and to present these pulses to the AND gates 25 in decimal sequences from the "most significant" to "least significant" digits held by these gates. In particular, the decoder 26 comprises a diode matrix which, as mentoned above, receives complementary input pulses (0, 1) for each pulse applied to its respective counter 30–33 and a binary 1 output is presented to each of the gates 25 in turn. The arrangement is such that these ten output pulses coincide in time with the first (or last) ten of the sixteen pulses passing through the AND circuit 28 during each cycle, the period during which the remaining six pulses occur being employed for clearing and resetting the gates. Accordingly, if there is a binary 1 in any one of the gates from the parallel output fed from the converter 6 a coincidence will be effected upon the binary 1 input being applied to that gate from the decoder 26 and an output will be applied to an OR circuit 34. The output from this OR circuit will thus be a series of binary digits (0, 1), the binary 1 for example being indicative of a coincidence of inputs to an AND gate 25 and the binary 0 being indicative of non-coincidence.

Since the output pulses occur in series form in a timed sequence, synchronising pulses must be developed in order for the timing intervals to be reproduced and this is effected by applying the sixteen pulses at the output of the AND circuit 28 to a differentiator and invertor circuit 35.

These synchronising pulses, together with the data pulses, are applied to the U.H.F. transmitter 9 from which they are transmitted to the receiver 11 at ground level. As mentioned above, only ten of the sixteen synchronising pulses are aligned with the data pulses, the remaining six pulses serving to "condition" the receiver for the receipt of this information.

The received data is channeled on the one hand to the protective relay devices 12 which operate a circuit breaker in the event of the binary data exceeding a predetermined magnitude, and on the other hand to the visual display device 15 after first being presented in parallel form and re-converted into decimal form from the binary notation.

This invention thus affords an accurate and convenient way of measuring a high voltage line parameter, in the case discussed above, the line current, and by employing radio transmission principles, avoids the need for the conventional pedestal type oil- or gas-filled current transformers.

The protective relay devices 12 may conveniently comprise a comparator arranged to provide an output signal should the digital information fed thereto from the receiver 11 deviate by more than a predetermined degree from a reference level set in the comparator, the output signal being used to operate a circuit breaker.

In an alternative arrangement of the protective relay devices 12, the "command" pulses derived from the sensing device 7 are also transmitted by the transmitter 9 so that the digital output of the receiver 11 is preceded by "command" pulses, each of which occurs simultaneously with a respective peak of the current in the line 2. The protective relay devices 12 also comprise means for deriving digital signals indicative of the peak values of a voltage, obtained from a suitable voltage divider, or transformer, which is in-phase with the voltage on the line 2. These means also provide "command" signals, each of which occurs simultaneously with a respective peak of the voltage on the line 2. The "command" pulses are fed to a phase meter to provide a signal which is indicative of the phase between the line current and the line voltage, which signal is fed, together with the digital signals, to a comparator arranged to provide an output should the line current deviate by more than a predetermined amount from a required level.

The complete transmitter unit may conveniently be housed in a weather-proof aluminium housing suspended on the line and is completely self-contained, being powered from the line supply itself, and the aerial, e.g. a corner reflector, may be sufficiently directional as to avoid interference between adjacent units. Supply lamps may be incorporated in each transmitter unit in order to provide a visual indication that the unit is functioning.

What we claim as our invention and desire to secure by Letters Patent is:

1. A system for measuring at a ground station a transmission parameter in a high voltage line of an electric power transmission system comprising suspension means, said suspension means suspending from said line, monitoring means inductively coupled to said line for monitoring said transmission parameter over a predetermined period of its cycle, converter means for converting the monitored information into digital information in serial form, an R.F. transmitter for transmitting said digital information, and an electric power supply inductively coupled to said high voltage line for supplying electric power to the monitoring means, the converter means and the R.F. transmitter, a reciever at said ground station for receiving the transmitted digital information, measuring means for measuring the digital information received by said receiver to provide a measurement of said transmission parameter, and signal responsive means responsive to the digital information received by said receiver for effecting protective action on the said electric power transmission system in the event of the said digital information being indicative of a fault on said high voltage line.

2. A system according to claim 1, in which said converter means comprises
an analogue to digital converter,
a plurality of parallel output circuits for said analogue to digital converter,
a serialising means connected to the parallel output circuits,
a plurality of gates in the serialising means, an individual one of said gates connected to each output circuit,
a common output circuit for said gates, and
sampling means in said serialising means for successively sampling said gates whereby to convert the digital information appearing at said parallel output circuits into serial form.

3. A system according to claim 2, comprising sensing means for sensing said transmission parameter,
a differentiator in said sensing means to provide a series of pulses, each pulse coinciding with a peak of said transmission parameter,
a trigger input circuit for said analogue to digital converter and a trigger input circuit for said serialising means,
individual connections between said differentiator and said trigger input circuits, and
means in said trigger input circuits for using each said pulse to operate said analogue to digital converter and said serialising means.

4. A system according to claim 1, in which the monitoring means comprises
circuit means for deriving a voltage proportional to, and having a fixed phase relationship with, said transmission parameter,
sensing means for sensing said transmission parameter to provide a series of pulses, and
means responsive to said pulses to monitor said voltage about the peaks thereof.

5. A system according to claim 4, wherein said circuit means comprises
a transformer having a primary provided by said high voltage line,
a secondary winding for said transformer, and
phase displacement means connected to said secondary winding for providing said voltage.

6. A system according to claim 5, in which said phase displacement means is an integrator.

7. A system according to claim 1, wherein said measuring means comprises
a digital to decimal converter for converting the digital information received by said receiver, and
display means for providing a visual indication of the decimal information.

8. A system according to claim 1, comprising
a circuit breaker in said high voltage line,
said signal responsive means including a control means for controlling the operation of the circuit breaker and being arranged to provide an output signal to open the circuit breaker in the event of the digital information received by said receiver being indicative of a fault on said high voltage line.

9. A system for measuring at a ground station a transmission parameter in a high voltage line of an electric power transmission system including
monitoring means comprising
means inductively coupled to the high voltage line for deriving a voltage proportional to said transmission parameter, and
sensing means for monitoring said voltage about the peaks thereof;
converter means comprising
an analogue to digital converter providing a digital output in parallel form indicative of the amplitude of said voltage, and
serialising means for converting said digital information from parallel form into serial form;
an R.E. transmitter for transmitting the digital information in serial form; and
an electric power supply inductively coupled to said high voltage line for supplying electric power to said monitoring means, said converter means and said R.F. transmitter,
suspension means for suspending from said high voltage line said monitoring means, said converter means, said R.F. transmitter and said electric power supply,
a receiver at said ground station for receiving the transmitted digital information,
measuring means for measuring the digital information received by said receiver to provide a measurement of said transmission parameter, and
signal responsive means responsive to the digital information received by said receiver for effecting protective action for said electric power transmission system in the event of said digital information being indicative of a fault on said high voltage line.

10. A system for measuring at a ground station a transmission parameter in a high voltage line of an electric power transmission system including
monitoring means comprising
circuit means inductively coupled to said high voltage line for deriving a voltage proportional to said transmission parameter, and
sensing means for monitoring said voltage about the peak thereof;
converter means for converting the monitored information into digital information in serial form;
an R.F. transmitter for transmitting said digital information in serial form; and
an electric power supply inductively coupled to said high voltage line for supplying electric power to said monitoring means, said converter means and said R.F. transmitter;
suspension means for suspending from said high voltage line said monitoring means, said converter means, said R.F. transmitter and said electric power supply,
a receiver at said ground station for receiving the transmitted digital information,
display means for providing a visual indication of the transmitted digital information,
a circuit breaker in said line, and
control means for controlling the operation of said circuit breaker in dependence on the digital information received by said receiver, said control means being arranged to provide an output signal to open said circuit breaker in the event of said digital information being indicative of a fault on said high voltage line.

11. A system for detecting faults on a high voltage line of an electric power transmission system comprising
suspension means, said suspension means suspending from said line,
monitoring means inductively coupled to said high voltage line for monitoring said transmission parameter over a predetermined period of its cycle,
converter means for converting the monitored information into digital information in serial form, an R.F. transmitter for transmitting said digital information, and an electric power supply inductively coupled to said high voltage line for supplying electric power to the monitoring means, the converter means and the R.F. transmitter, a ground station including a receiver for receiving the transmitted digital information, a circuit breaker in said line, and control means for controlling the operation of said circuit breaker in dependence on the digital information received by said receiver, said control means being arranged to provide an output signal to open said circuit breaker in the event of said digital information being indicative of a fault on said high voltage line.

References Cited
UNITED STATES PATENTS

| | | | |
|---|---|---|---|
| 2,879,454 | 3/1959 | Hodges et al. | 317—28 |
| 2,946,044 | 7/1960 | Bolgiano et al. | 340—174 |
| 3,030,614 | 4/1962 | Lehan et al. | 340—204 |
| 3,144,585 | 8/1964 | Blakemore | 317—28 |
| 3,114,900 | 12/1963 | Anderson | 340—204 X |
| 3,273,017 | 9/1966 | Mathews | 317—28 X |
| 3,293,605 | 12/1966 | Moore | 340—150 |
| 3,312,866 | 4/1967 | Rockefeller | 317—28 |

JOHN F. COUCH, Primary Examiner

J. D. TRAMMELL, Assistant Examiner

U.S. Cl. X.R.

340—150, 204